Oct. 28, 1952   S. DU PREE   2,615,203
MEANS FOR FORMING AND CURING PLASTIC COMPOUNDS
Filed Jan. 9, 1950
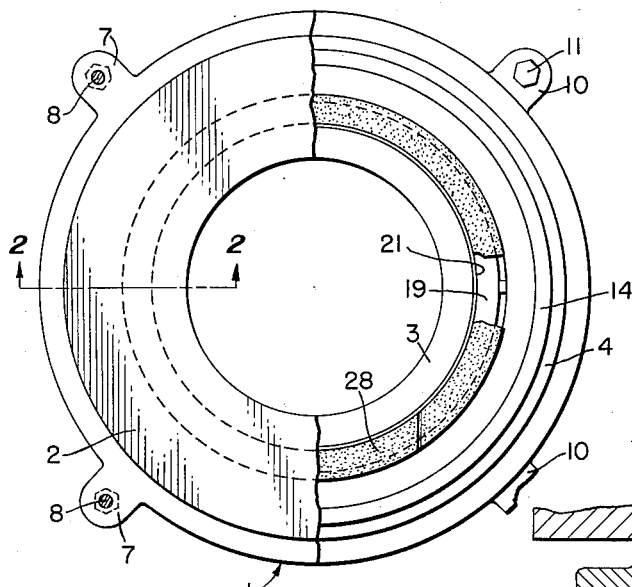
FIG. 1
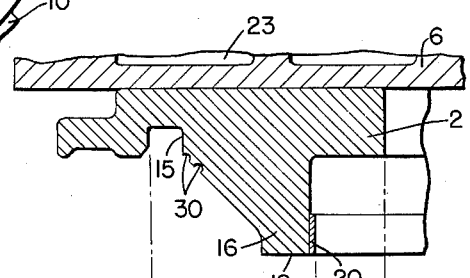
FIG. 2
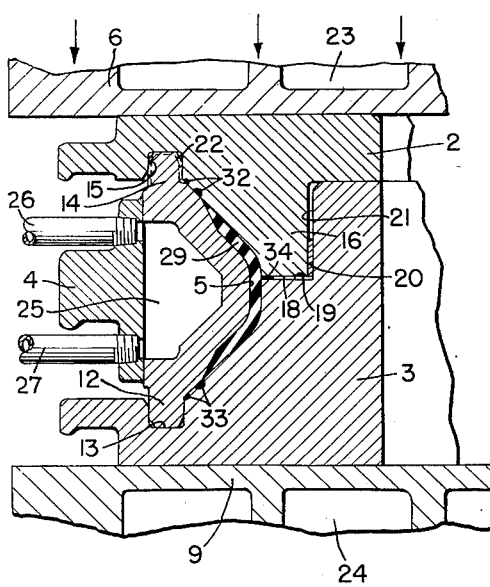
FIG. 3
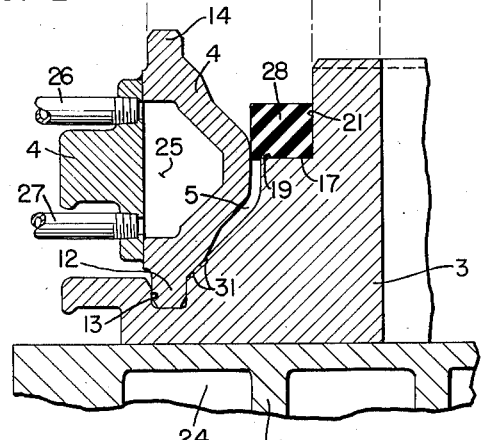
Inventor
SAM DU PREE
By R. L. Miller
ATTORNEY Patented Oct. 28, 1952

2,615,203

UNITED STATES PATENT OFFICE 2,615,203

MEANS FOR FORMING AND CURING PLASTIC COMPOUNDS

Sam Du Pree, Akron, Ohio, assignor to Wingfoot Corporation, Akron, Ohio, a corporation of Delaware Application January 9, 1950, Serial No. 137,573

10 Claims. (Cl. 18—42)

The present invention relates to an improved apparatus for forming and curing heat curable moldable plastic compounds. More particularly, the invention pertains to a novel molding apparatus by the use of which either thermosetting or thermoplastic materials are displaced into a mold cavity of relatively narrow, elongated cross-section by the application of heat and pressure applied directly to the materials by the separable mold parts which cooperate to define the mold cavity.

The apparatus of the present invention differs materially from that employed in existing molding practices. In compression molding, individual pieces of uncured plastic compound are placed directly in each of the actual mold cavities and the mold counterpart simply applies the pressure to form the stock in the cavity. Transfer molding contemplates the use of one or more slugs of the uncured plastic compound which is forced by one or more plungers or rams forming an independent part of the mold structure through a series of flow channels into several mold cavities. Injection molding, on the other hand, utilizes an external mechanism which forces the uncured plastic compound into a tighly closed mold in which the several mold cavities are connected with a central canal by a series of branch passages.

The teachings of the present invention are particularly well adapted to use in the manufacture of such articles as tire flaps, tire shaping bladders and many other similar products which are characterized by relatively narrow, elongated cross-sections terminating in opposite marginal extremities and either of endless or substantially continuous lengths.

In the apparatus of the present invention the plastic compound is introduced into a plastic receiving recess which is located at one side of an intermediate area of the mold cavity and in spaced relation to its marginal extremities. The interfitting of the mold parts on closing of the mold unit comprising the apparatus of the invention causes the material to be displaced from the plastic receiving recess directly into the adjacent mold cavity.

In all of the conventional practices mentioned above, the resulting product requires extensive trimming operations, most of which must be done by mechanical cutting units. The removal of the excess plastic compound in the branch passages and flow channels employed in the transfer and extrusion processes invariably forms defects or blemishes on the surfaces of the finished product. All of these difficulties are avoided in the use of the novel apparatus of the present invention.

Since, as previously indicated, the plastic receiving recess of the mold apparatus of the present invention is located in spaced relation to the marginal extremities of the mold cavity, the plastic compound will be caused to move toward the spaced marginal extremities of the mold cavity as it is displaced from the recess by the closing of the several mold parts of the mold apparatus. As a result of the foregoing, the distance which the plastic compound must flow within the mold cavity is materially reduced. In the production of articles of relatively narrow, elongated cross-section, imperfections traceable to cold checking of the plastic compound and entrapment of air and gases, are virtually eliminated.

Moreover, the molding apparatus of the present invention eliminates the period of waiting for the plastic compound to reach a flowable temperature when subjected to heat and pressure. The direct application of heat and pressure on the plastic compound makes it possible to displace the material directly into the adjoining mold cavity with a minimum of delay.

It is, therefore, an object of the present invention to provide an apparatus for forming plastics which is faster in its operation and more economical than conventional compression, transfer, or injection molding apparatus.

It is a further object of the invention to produce articles from plastic compounds which possess a smooth finish and require a minimum of trimming of the excess material or flash occurring at the mold partings.

Other objects of the invention will become apparent as the description of the invention proceeds with reference to the accompanying drawing.

Fig. 1 represents a plan view with parts broken away of a typical form of mold unit with which the method of the present invention is particularly well adapted to be employed. Fig. 2 is a vertical cross section taken along the line 2—2 in Fig. 1 and illustrates the registering mold parts disposed in separable relation following the loading operation. Fig. 3 corresponds generally to Fig. 2, but differs therefrom in showing the mold unit as being closed.

In Fig. 1 of the drawing, the reference numeral 1 identifies the novel molding apparatus or mold unit which embodies the teachings and employs the principles of the present invention in the manufacture of plastic articles such, for example, as endless all-rubber tire flaps, diaphragms, and the like. The mold unit 1 comprises a top mold element 2, a bottom mold element 3, and an intermediate mold element 4, all of which, in the present instance, are of annular form and register one with the other. The several mold elements 2, 3, and 4 cooperate upon registration, as shown in Fig. 3, to form a mold cavity 5 having the shape and characteristics of the product which is to be formed from the plastic compound.

The top mold element 2 is advantageously secured to the movable platen 6 of a conventional mold press (not shown) as by means of the lugs 7 integrally formed thereon and the bolts 8. The bottom mold element 3 is similarly mounted on the fixed platen 9 by means of the lugs 10 and bolts 11. The intermediate mold element 4 is supported by the bottom mold element 3 and held in place thereon by means of the annular rib 12 which fits closely into the groove 13 in the bottom mold element. A similar annular rib 14 interfits closely with the groove 15 on the top mold element 2 when the mold unit is closed (see Fig. 3.)

A projecting flange or plunger portion 16 depending from the top mold element 2 is adapted to fit closely with the corresponding pocket means or plastic receiving recess 17 in the bottom mold element 3. The recess 17 has a plastic receiving capacity at least equal to the capacity of the completed mold cavity 5 when the several mold elements 2, 3 and 4 are closed. The surface 18 of the plunger portion 16 of the top mold element 2, approaches actual face-to-face contact with the separation plane or registration surface 19 of the recess 17 of the bottom mold element 3 exerting extreme pressure thereagainst when the movable platen 6 of the mold press is closed with respect to the fixed platen 9.

A bushing ring 20 of brass, bronze, or other similar material is advantageously provided on the flange portion 16 of the top mold element 2 to insure an extremely tight fit with respect to the vertically disposed retaining means or annular surface 21 when the several mold elements 2, 3, and 4 are closed (see Fig. 3). A similar bushing surface (not shown) is advantageously provided on the annular ribs 12 and 14 of the intermediate mold element 4 to insure a positive fit with their respective grooves 13 and 15 on the top and bottom mold elements 2 and 3, respectively. The bushing surfaces of the ribs 12 and 14 may, however, be interrupted at spaced intervals about the periphery of the ribs in the manner indicated in dotted lines at 22 (see Fig. 3) to provide for the release of any air or gas which might become entrapped in the mold cavity 5 when the mold unit 1 is closed and the plastic compound is forced into the cavity.

The top and bottom mold elements 2 and 3 are heated directly from the platens 6 and 9, respectively, on which they are mounted or the elements themselves may alternatively be chambered for heating. Chambers 23 and 24 in the platens 6 and 9, respectively, afford the required heat to insure curing of the plastic compound in the mold cavity. The auxiliary heating chamber 25 in the intermediate mold element 4 (see Figs. 2 and 3) illustrates the manner in which a continuous flow of steam or other heating fluid is capable of being maintained with the aid of the inlet and outlet connections 26, 27.

In the operation of the mold unit 1, a supply or slug 28 of plastic compound is introduced into the recess 17 between the mold elements 2 and 3 directly adjacent the mold cavity 5, the formation of which is completed when the several mold elements 2, 3, and 4 mate upon the closing of the press with the lowering of the movable platen 6. The slug 28 which represents the supply of the plastic compound, in this instance an uncured rubber stock, is carefully determined as to quantity so as to insure that the mold cavity 5 will be completely filled. The slug 28 is placed, as indicated, on the plane of separation or registration surface 19 of the recess 17 in the bottom mold element where the heat and pressure imparted by the several mold elements 2, 3, and 4 will be directly applied to the slug 28 when the press is closed.

Since it is desirable that the volume of the plastic compound supplied to the mold unit 1 should be at least equal to or slightly in excess of the capacity of the mold cavity 5 for best results, there will ordinarily be a slight amount of excess material in the form of "flash," as it is called, to be trimmed off or removed from the finished product 29 at the completion of the forming and vulcanizing operation. It is advantageous that what flash is formed be localized at the extremities of the mold cavity 5 in order that it may be readily removed by being trimmed or stripped off. To this end, the annular grooves or pockets 30 and 31 are provided adjacent the extremities of the mold cavity 5 in the walls of the top and bottom mold elements 2 and 3, respectively (see Fig. 2) to collect this small excess material 32 and 33 (see Fig. 3).

A similar small projecting flash 34 (see Fig. 3) may result at the plane of separation or registration surface 19 of the recess 17 the bottom mold element 3 due to the failure of the top mold element 2 to completely displace all of the plastic compound comprising the slug 28. These flash portions 32, 33, and 34 are so located on the product 29 that its functional portions are smooth and entirely free from blemishes. Upon removal of the product 29 from the mold unit 1, the flash portions 32, 33, and 34 can be readily stripped off by hand after being pierced with a knife or some sharp instrument capable of freeing the flash at one point.

It will be understood that once the press is closed and the slug 28 of the plastic compound is displaced from the recess 17 into the mold cavity 5 by the mating of the plunger portion 16 with said recess and under the influence of the heat and pressure produced by the cooperating top and bottom mold elements 2 and 3, the press is permitted to remain closed until the plastic compound is completely cured. The time interval between the closing and opening of the press may be controlled by any well known timing device so as to insure a uniform cure time for each class of material employed.

One of the highly advantageous features of the mold unit 1 of the present invention will be apparent from Figs. 2 and 3 of the drawings. It will be noted that the recess 17 in the bottom mold element 3 opens directly into and is disposed approximately equidistant from the marginal extremities of the mold cavity 5 as a whole when the several mold elements 2, 3 and 4 are closed. In general, the recess 17 should be located between the mold cavity 5 and the retaining means 21. The recess 17, in view of the character of the product being formed in the present instance, is advantageously disposed so as to be surrounded by the mold cavity (see Fig. 1). It is highly advantageous to locate the plastic material immediately adjacent to the mold cavity for the reason that much molding time is saved in the operation of forming the product due to the great reduction over the transfer method, for example, in the path of travel of the plastic compound from the recess 17 into the mold cavity 5.

It will be readily understood that, with an endless plastic product, such as the product 29 illustrated herein, having a generally crescent shaped cross section, it is advantageous to locate the pocket means or recess 17 in the bottom mold element 3 in concentric relation to and within or encircled by the mold cavity 5. This, as previously pointed out, insures that the inside arcuate face will be smooth and completely free from mold marks or blemishes resulting from the removal of flash. In the event that the product 29 were such that the section was bowed in the reverse direction to that shown, it would be desirable to locate the pocket means or recess 17 outside or encircling the mold cavity 5 with the retaining means 21 at the outermost extremity of said groove.

Any suitable form of endless molded product may be formed by the apparatus of the present invention. It is conceivable that a tubular element of endless but rectangular form as distinguished from the annular type illustrated could be manufactured in the same manner. Moreover, the endless or annular element could be formed in a plurality of segments or slit in one position by the simple expedient of inserting one or more blade elements (not shown) in the mold cavity.

It is highly essential, however, when such a disposition of the slug 28 of plastic material with respect to the mold cavity 5 as that shown herein is employed, that a secure means be provided to prevent the escape of the plastic material in a direction away from the mold cavity. Thus, it is imperative that the vertically disposed annular surface 21 be provided to restrict the outward flow of the plastic material away from the mold cavity 5. In addition, the provision of the closely fitting bushing ring 20 on the plunger portion 16 of the top mold element 2 further insures against the escape of the plastic material when the mold unit 1 is closed, thereby subjecting the slug 28 to heat and pressure.

It will be apparent from Figs. 2 and 3 of the drawings that the mold cavity 5 is made up of an area which has a fixed volume defined by the bottom mold element 3 and the intermediate mold element 4 and an adjoining area of variable volume defined by the top mold element 2 and the intermediate mold element 4. The plastic receiving recess 17 is advantageously positioned at the junction of these two mold cavity areas.

By "plastic compound" wherever used herein, it is intended to include materials of the thermoplastic and thermosetting types as well as various forms of stock such as those used in the rubber industry, including natural or synthetic rubber, all of which solidify or convert from a flowable state to a more rigid state by a vulcanizing reaction when heated to a predetermined temperature.

While certain representative embodiments and details have been shown for the purpose of illustrating the invention, it will be apparent to those skilled in this art that various changes and modifications may be made therein without departing from the spirit or scope of the invention.

I claim:

1. Apparatus for forming and curing a heat curable moldable plastic compound comprising a multiple-part mold which is provided with heating means and in which the several mold parts interfit to form a mold cavity of narrow, elongated cross-section terminating in opposite marginal extremities and being of the size and shape of the article to be produced from the plastic compound and to define the marginal extremities of said mold cavity; a plastic receiving recess in one of the mold parts opening directly into the mold cavity along the entire length thereof and disposed intermediate of and in spaced relation to the extremities of the mold cavity, said recess having a plastic receiving capacity at least equal to that of the mold cavity; and a plunger portion on another of the mold parts which registers with and substantially completely fills the recess on the first-mentioned mold part when the mold is closed.

2. Apparatus for forming and curing a heat curable moldable plastic compound comprising a multiple-part mold which is provided with heating means and in which at least certain of the mold parts interfit to form an endless mold cavity of narrow, elongated cross-section terminating in opposite marginal extremities and being of the size and shape of the article to be formed from the plastic compound and to define the marginal extremities of said mold cavity; a plastic receiving recess in one of the mold parts disposed intermediate of and in spaced relation to the marginal extremities of the mold cavity as well as extending concentrically of and opening directly into said mold cavity, said recess having a plastic receiving capacity at least equal to that of the mold cavity; and a plunger portion on another of the mold parts which registers with and substantially completely fills the recess on the first-mentioned mold part when the mold is closed.

3. Apparatus for forming and curing a heat curable moldable plastic compound comprising a mold embodying top, bottom and intermediate members which are provided with heating means and mutually interfit to form a mold cavity of narrow, elongated cross-section terminating in opposite marginal extremities one of which is defined by the mated bottom and intermediate members, while the other is defined by the mated top and intermediate members when the mold is closed; a plastic receiving recess in the bottom member opening directly into the mold cavity along the entire length thereof and in spaced relation to that extremity of the mold cavity defined by the mated bottom and intermediate members of the mold, said recess having a plastic receiving capacity at least equal to that of the mold cavity; and a plunger portion on the top member of the mold which registers with and substantially completely fills the recess in the bottom member when the mold parts are closed completing the mold cavity.

4. Apparatus for forming and curing a heat curable moldable plastic compound comprising a mold embodying heated top, bottom and intermediate members which mutually interfit to form an endless mold cavity of narrow, elongated cross-section terminating in opposite marginal extremities, one of which is defined by the mated bottom and intermediate members, while the other is defined by the mated top and intermediate members when the mold is closed; a plastic receiving recess in the bottom member extending concentrically of and opening directly into the mold cavity as well as being disposed in spaced relation to that extremity of the mold cavity defined by the mated bottom and intermediate members of the mold, said recess having a plastic receiving capacity at least equal to that of the mold cavity; a plunger portion on the top member of the mold which registers with and substantially completely fills the recess in the bottom member as the mold parts are closed completing the mold cavity; and means adjacent the recess and the plunger portion which coact to seal the recess against the escape of the plastic compound therefrom as the several parts of the mold are closed.

5. Apparatus for forming and curing a heat curable moldable plastic compound comprising a multiple-part mold in which at least three of the mold parts are provided with heating means and have recessed portions therein for forming an endless mold cavity of narrow, elongated cross-section terminating in opposite marginal extremities when the several mold parts are interfitted; a plastic receiving land portion on one of the mold parts concentric with and opening directly into the recessed portion therein as well as being disposed substantially equidistant from the marginal extremities of the mold cavity, said land portion having a plastic receiving capacity at least equal to that of the mold cavity; a shoulder portion at the opposite extremity of the land portion from the recessed portion; and a plunger portion on another of the mold parts which registers with the land portion and encompasses the shoulder portion when the mold is closed.

6. Apparatus for forming and curing a heat curable moldable plastic compound comprising a multiple-part heated mold in which at least three of the mold parts are provided with heating means and have recessed portions therein which form an annular mold cavity of narrow, elongated cross-section terminating in opposite marginal extremities when the several mold parts are interfitted; an annular plastic receiving land portion on one of the mold parts opening directly into and disposed in concentric relation to the recessed portion therein as well as being substantially equidistant from the marginal extremities of the mold cavity, said land portion having a plastic receiving capacity at least equal to that of the mold cavity; an upwardly extending shoulder formed at that extremity of the land portion opposite the recessed portion; and a depending plunger portion on another of the mold parts which registers with the land portion and encompasses the shoulder when the mold is closed.

7. Apparatus for forming and curing a heat curable moldable plastic compound comprising a multiple-part heated mold embodying mutually interfitting top, bottom, and intermediate members provided with heating means and having recessed portions therein which form an annular mold cavity of narrow, elongated cross-section terminating in opposite marginal extremities when the members are interfitted; an upwardly extending annularly shaped wall portion on the bottom member in spaced concentric relation to the recessed portion therein; a plastic receiving land portion on the bottom member disposed between the wall portion and the recessed portion therein and substantially equidistant from the marginal extremities of the mold cavity when the mold is closed, said land portion having a plastic receiving capacity at least equal to that of the mold cavity; and a depending annular plunger portion on the top member adjacent the recessed portion therein for registration with the land portion on the bottom member when the mold is closed.

8. Apparatus for forming and curing heat curable moldable plastic compound comprising a multiple-part heated mold embodying mutually interfitting top, bottom, and intermediate members provided with heating means and having recessed portions therein which form an annular mold cavity of narrow, elongated cross-section terminating in opposite marginal extremities when the members are interfitted; an upwardly extending annularly shaped wall portion on the bottom member in spaced concentric relation to the recessed portion therein; a plastic receiving land portion on the bottom member disposed between the wall portion and the recessed portion therein and substantially equidistant from the marginal extremities of the mold cavity when the mold is closed, said land portion having a plastic receiving capacity at least equal to that of the mold cavity; a depending annular plunger portion on the top member adjacent the recessed portion therein for registration with the land portion on the bottom member when the mold is closed; and overflow grooves formed in the top and bottom member just beyond the marginal extremities of the mold cavity.

9. Apparatus for forming and curing a heat curable plastic compound comprising a multiple-part mold provided with heating means and having a mold cavity of narrow, elongated cross-section terminating in opposite marginal extremities, a plastic receiving recess in one of the mold parts opening directly into the mold cavity along the entire length of the cavity and having a plastic receiving capacity at least equal to that of the mold cavity, the plastic receiving recess being disposed in spaced relation to the marginal extremities of the mold cavity at one side of an intermediate area of the mold cavity, and another of the mold parts being movable to close and open the mold cavity, said movable mold part having a plunger portion which registers with and completely fills the plastic receiving recess in the closed position of said movable mold part, said plunger portion during movement of said movable mold part from open to closed position part being adapted to force plastic from the plastic receiving recess into the mold cavity and in opposite directions in the mold cavity toward the spaced marginal extremities thereof and to cause the plastic to entirely fill the mold cavity.

10. Apparatus for forming and curing a heat curable plastic compound comprising a multiple-part mold provided with heating means and forming when the mold is closed a mold cavity of the size and shape of the article to be produced from the plastic compound, said mold cavity including one area of fixed volume for one part of the article to be molded and an adjoining area of variable volume for the adjoining part of the article to be molded, said mold cavity area of variable volume being formed in part by a movable mold part which is movable relative to the rest of the mold to close and open the mold, said movable mold part in moving from open to closed position being adapted to reduce said mold cavity area of variable volume from greater than molding size to molding size, another of the mold parts having a plastic receiving recess opening directly into the mold cavity at the junction of said mold cavity area of fixed volume and said mold cavity area of variable volume, said recess extending the entire length of the mold cavity and having a plastic receiving capacity at least equal to the capacity of the entire mold cavity when said movable mold part is in closed position, and a plunger portion on said movable mold part adapted to force plastic from the plastic receiving recess into both the mold cavity area of fixed volume and the mold cavity area of variable volume during movement of said movable mold part from open to closed position.

SAM DU PREE.

REFERENCES CITED

The following references are of record in the file of this patent:

UNITED STATES PATENTS

| Number | Name | Date |
|---|---|---|
| 1,209,358 | Terkelsen | Dec. 19, 1916 |
| 1,209,607 | Michelin | Dec. 19, 1916 |
| 1,417,180 | Kline | May 23, 1922 |
| 1,419,577 | Marquette | June 13, 1922 |
| 1,654,001 | Howard | Dec. 27, 1927 |
| 1,910,525 | Dempsey | May 23, 1933 |
| 1,992,170 | Burchett | Feb. 26, 1935 |
| 2,072,349 | Wayne | Mar. 2, 1937 |
| 2,100,985 | Smally | Nov. 30, 1937 |
| 2,148,079 | Martin | Feb. 21, 1939 |
| 2,203,543 | Pancorbo | June 4, 1940 |
| 2,248,060 | Brundage | July 8, 1941 |
| 2,251,858 | Snell | Aug. 5, 1941 |
| 2,314,176 | Talalay | Mar. 16, 1943 |
| 2,351,329 | Gerstenmaier | June 13, 1944 |
| 2,452,382 | Long | Oct. 29, 1948 |
| 2,510,841 | Stowe | June 6, 1950 |

FOREIGN PATENTS

| Number | Country | Date |
|---|---|---|
| 211,090 | France | Jan. 7, 1879 |
| 10,171 | Great Britain | 1892 |